(12) United States Patent
Saraf (10) Patent No.: US 11,818,201 B2
(45) Date of Patent: Nov. 14, 2023

(54) METHODS, SYSTEMS AND COMPUTER PROGRAM PRODUCTS FOR CLOUD BASED CROSS-DEVICE SOFTWARE APPLICATION EXECUTION

(71) Applicant: Bluestack Systems, Inc., Campbell, CA (US)

(72) Inventor: Suman Saraf, Gurgaon (IN)

(73) Assignee: Bluestack Systems, Inc., Campbell, CA (US)

(\*) Notice: Subject to any disclaimer, the term of this patent is extended or adjusted under 35 U.S.C. 154(b) by 0 days.

(21) Appl. No.: 17/962,441

(22) Filed: Oct. 7, 2022

(65) Prior Publication Data
US 2023/0114786 A1 Apr. 13, 2023

Related U.S. Application Data

(60) Provisional application No. 63/253,940, filed on Oct. 8, 2021.

(51) Int. Cl.
| | | |
|---|---|---|
| *G06F 15/16* | (2006.01) | |
| *H04L 67/1008* | (2022.01) | |
| *H04L 67/131* | (2022.01) | |
| *G06F 9/48* | (2006.01) | |

(52) U.S. Cl.
CPC ........ *H04L 67/1008* (2013.01); *G06F 9/4843* (2013.01); *H04L 67/131* (2022.05)

(58) Field of Classification Search
None
See application file for complete search history.

(56) References Cited

U.S. PATENT DOCUMENTS

| | | | |
|---|---|---|---|
| 2014/0122702 A1\* | 5/2014 | Jung | H04L 67/535 709/224 |
| 2015/0278513 A1 | 10/2015 | Krasin et al. | |
| 2017/0223097 A1 | 8/2017 | Zhang et al. | |
| 2018/0373994 A1 | 12/2018 | Doucette et al. | |

\* cited by examiner

*Primary Examiner* — Wing F Chan
*Assistant Examiner* — Andrew Woo
(74) *Attorney, Agent, or Firm* — The Webb Law Firm (57) ABSTRACT

Provided are methods, systems and computer program products for cloud based software program execution to enable cross-device implementation of cloud based software application execution by a cloud services server system. The methods include (i) assigning a plurality of hardware devices for execution of the instance of the cloud based software application, (ii) receiving a software application program instruction for execution, (iii) determining attributes of the received software application program instruction, (iv) selecting based on one or more determined attributes of the received software application program instruction, one of the first computing device and the second computing device for execution of the received software application program instruction and (v) routing the received software application program instruction to the selected first or second computing device for execution by the selected first or second computing device.

11 Claims, 5 Drawing Sheets

METHODS, SYSTEMS AND COMPUTER PROGRAM PRODUCTS FOR CLOUD BASED CROSS-DEVICE SOFTWARE APPLICATION EXECUTION

CROSS-REFERENCE TO RELATED APPLICATION

This application claims priority to U.S. Provisional Patent Application No. 63/253,940 filed Oct. 8, 2021, the disclosure of which is hereby incorporated by reference in its entirety.

BACKGROUND OF THE INVENTION

Field of the Invention

The present invention relates to provisioning of cloud based software services. In particular, the present invention provides methods, systems and computer program products for cloud based software program execution, and in an embodiment for cloud based execution of gaming software.

Description of Related Art

With the increase in availability of affordable computing hardware, it has become commonplace for individuals to use computing devices or data processing devices for accessing cloud based, or network based, services.

In a typical cloud based software services environment, one or more client terminals may interface through a network (such as the Internet), with a server (or with any other computing device located within the cloud), which is configured to provide cloud based service(s) to a requesting client terminal. In providing the cloud based software service(s), a software application required by a requesting client terminal is installed and run on the server, and video and audio output data from the software application is streamed to and rendered on the requesting client terminal. The inputs received from a user or operator of the requesting client terminal are in turn transmitted back to the server and are used to control execution of the software application that is running on the server.

Performance related problems arise in connection with provision of cloud based software services—particularly where a server or computing device (within the cloud) which is assigned the task of executing an instance of a software application, lacks one or more computing capabilities or hardware capabilities that are required for optimal execution of the software application. The lack of sufficient hardware or computing capabilities in the server or computing device invariably results in sub-optimal execution of the instance of the software application, and a correspondingly poor user experience.

By way of a specific example, the typical cloud based software services model faces challenges when used for implementing or executing software that has been configured for implementation by mobile devices—for example, software that has been written for implementation within the Android™ operating system. Such software is written specifically for execution by ARM (Advanced RISC Machine) processors or RISC (Reduced Instruction Set Computing) processor or mobile device processors (or by any hardware component that includes any such processors)—and not for execution on the x86 family of processors. As a result, instances of software that has been written specifically for execution within a mobile devices, or a device running the Android™ operating system, or for execution on an ARM/RISC processor, require to be executed on an ARM/RISC processor—and cloud based software services systems are therefore typically configured to allocate execution of such software instance to a cloud device/cloud resource that has an ARM/RISC processor.

So for example, a cloud based instance of an Android game may be assigned for execution by the cloud based software services system to a computing device that runs an ARM/RISC processor. However, ARM/RISC processors typically have limited graphic handling capabilities (particularly when compared with other processors/devices that have specialized graphics processing units (GPUs)). As a result, assignment of gaming software that is graphics or video intensive to a computing device that comprises an ARM/RISC processor for execution often results in a relatively poor graphics output, and a correspondingly poor end user experience.

There is accordingly a need to ensure that a cloud based software services environment can ensure that any cloud based software instance receives all hardware support that it requires for optimal execution, in a manner that is efficient and opaque to the end-user.

SUMMARY OF THE INVENTION

The present invention relates to cloud based cross-device software application execution. The invention provides methods, systems and computer program products for cross-device software program execution—for implementation with cloud based software service environments, and in a specific embodiment, for implementation within cloud gaming systems.

In an embodiment, the invention provides a method for cross-device implementation of cloud based software application execution by a cloud services server system, wherein output data from an instance of the cloud based software application is streamed to and rendered on a client terminal that is interfaced with the cloud services server system through a network. The method comprises the steps of (i) assigning a plurality of hardware devices for execution of the instance of the cloud based software application, the plurality of hardware devices comprising at least a first computing device and a second computing device, wherein (a) each of said first computing device and said second computing device are distinct from the client terminal, and (b) each of said first computing device and said second computing device has at least one hardware configuration attribute that is not shared by the other of said first computing device and said second computing device, (ii) assigning the first computing device for executing a first set of software application program instructions associated with functionality of the instance of the cloud based software application, wherein the first set of software application program instructions which have a first set of attributes, and (iii) assigning the second computing device for executing a second set of software application program instructions associated with functionality of the instance of the cloud based software application, wherein the second set of software application program instructions which have a second set of attributes, (iv) receiving a software application program instruction for execution, wherein said software application program instruction is associated with functionality of the instance of the cloud based software application, (v) determining attributes of the received software application program instruction, (vi) selecting based on one or more determined attributes of the received software application program instruction, one of the first computing device and the second computing device for execution of the received software application program instruction, wherein the step of selecting one of the client terminal and the server comprises (c) responsive to the one or more determined attributes matching attributes within the first set of attributes, selecting the first computing device for execution of the received software application program instruction, and (d) responsive to the one or more determined attributes matching attributes within the second set of attributes, selecting the second computing device for execution of the received software application program instruction, (vii) routing the received software application program instruction to the selected first or second computing device for execution by the selected first or second computing device.

The invention also provides a system for cross-device implementation of cloud based software application execution by a cloud services server system, wherein output data from an instance of the cloud based software application is streamed to and rendered on a client terminal that is interfaced with the cloud services server system through a network. The system comprises at least one processor and a non-transitory memory. The processor is configured to implement the steps of (i) assigning a plurality of hardware devices for execution of the instance of the cloud based software application, the plurality of hardware devices comprising at least a first computing device and a second computing device, wherein (a) each of said first computing device and said second computing device are distinct from the client terminal, and (b) each of said first computing device and said second computing device has at least one hardware configuration attribute that is not shared by the other of said first computing device and said second computing device, (ii) assigning the first computing device for executing a first set of software application program instructions associated with functionality of the instance of the cloud based software application, wherein the first set of software application program instructions which have a first set of attributes, and (iii) assigning the second computing device for executing a second set of software application program instructions associated with functionality of the instance of the cloud based software application, wherein the second set of software application program instructions which have a second set of attributes, (iv) receiving a software application program instruction for execution, wherein said software application program instruction is associated with functionality of the instance of the cloud based software application, (v) determining attributes of the received software application program instruction, (vi) selecting based on one or more determined attributes of the received software application program instruction, one of the first computing device and the second computing device for execution of the received software application program instruction, wherein the step of selecting one of the client terminal and the server comprises (c) responsive to the one or more determined attributes matching attributes within the first set of attributes, selecting the first computing device for execution of the received software application program instruction, and (d) responsive to the one or more determined attributes matching attributes within the second set of attributes, selecting the second computing device for execution of the received software application program instruction, (vii) routing the received software application program instruction to the selected first or second computing device for execution by the selected first or second computing device.

The system also provides a computer program product cross-device implementation of cloud based software application execution by a cloud services server system, wherein output data from an instance of the cloud based software application is streamed to and rendered on a client terminal that is interfaced with the cloud services server system through a network. The computer program product comprising a non-transitory computer readable medium having a computer readable program code embodied therein. The computer readable program code comprises instructions for implementing the steps of (i) assigning a plurality of hardware devices for execution of the instance of the cloud based software application, the plurality of hardware devices comprising at least a first computing device and a second computing device, wherein (a) each of said first computing device and said second computing device are distinct from the client terminal, and (b) each of said first computing device and said second computing device has at least one hardware configuration attribute that is not shared by the other of said first computing device and said second computing device, (ii) assigning the first computing device for executing a first set of software application program instructions associated with functionality of the instance of the cloud based software application, wherein the first set of software application program instructions which have a first set of attributes, and (iii) assigning the second computing device for executing a second set of software application program instructions associated with functionality of the instance of the cloud based software application, wherein the second set of software application program instructions which have a second set of attributes, (iv) receiving a software application program instruction for execution, wherein said software application program instruction is associated with functionality of the instance of the cloud based software application, (v) determining attributes of the received software application program instruction, (vi) selecting based on one or more determined attributes of the received software application program instruction, one of the first computing device and the second computing device for execution of the received software application program instruction, wherein the step of selecting one of the client terminal and the server comprises (c) responsive to the one or more determined attributes matching attributes within the first set of attributes, selecting the first computing device for execution of the received software application program instruction, and (d) responsive to the one or more determined attributes matching attributes within the second set of attributes, selecting the second computing device for execution of the received software application program instruction, (vii) routing the received software application program instruction to the selected first or second computing device for execution by the selected first or second computing device.

DESCRIPTION OF THE INVENTION

The invention provides cloud based cross-device software application execution. In various embodiments, the invention provides methods, systems and computer program products for cross-device software application execution. The solutions of the present invention may be implemented within cloud based software services solutions, and/or within cloud based gaming solutions.

Figure 1:
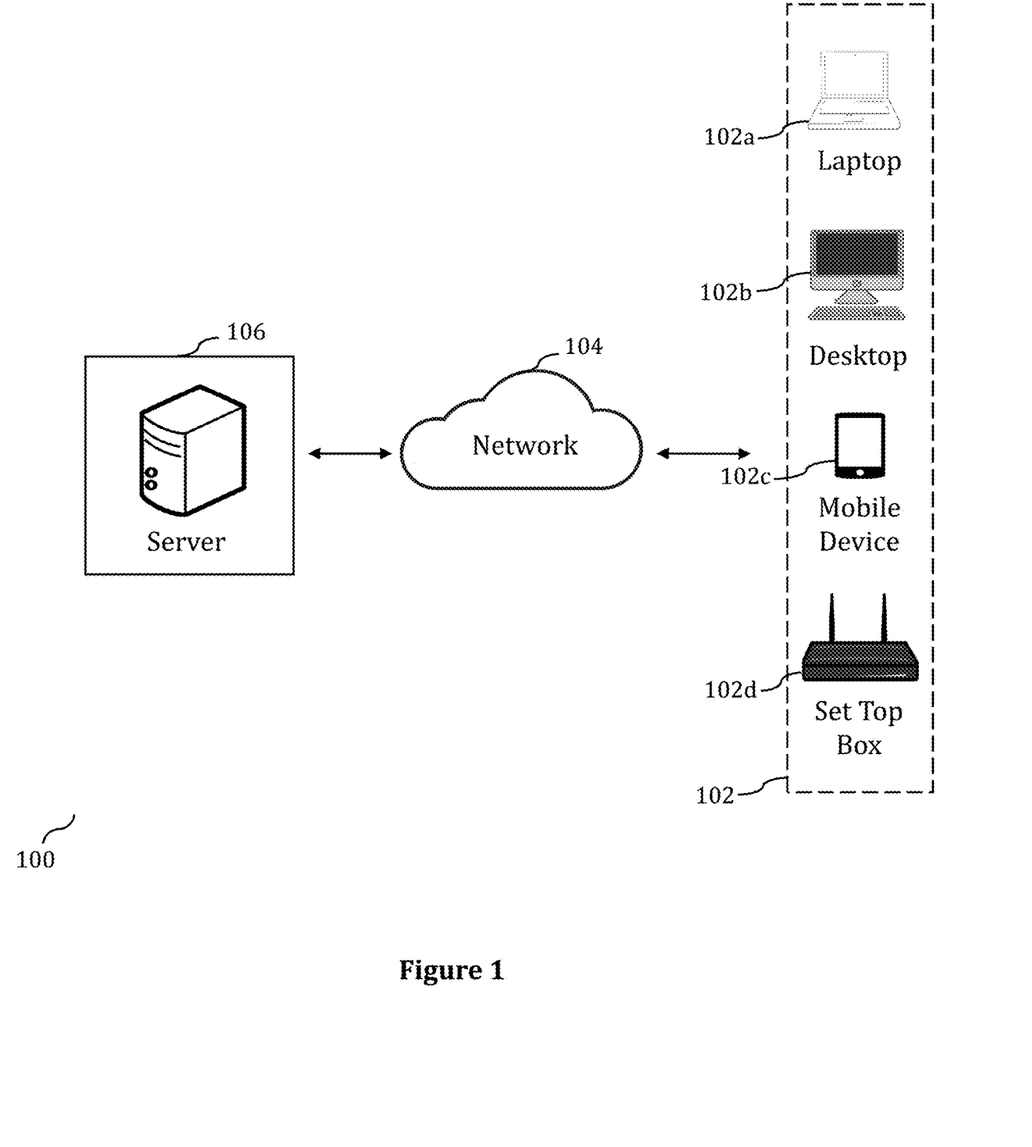
FIGS. 1 and 2 illustrate system environments of a kind that may be used to implement the teachings of the present invention.

FIG. 1 illustrates a system environment 100 of a kind that may be used for implementing cloud based, or network based, services in accordance with the teachings of the present invention. System environment 100 comprises one or more client terminals 102 (for example, any of laptop 102a, desktop 102b, mobile device 102c and/or set top box 102d) interfacing through network 104, with a server 106 (which server may comprise any cloud based computing device). Server 106 may be configured to provide cloud based service(s) to a requesting client terminal 102, wherein a software application required by client terminal 102 is installed and run on server 106, and video and audio output data from the software application is streamed to and rendered on client terminal 102. The inputs received from a user or operator of the client terminal 102 are in turn transmitted back to server 106 and are used to control execution of the software application that is running on the server 106.

So for example, in a cloud based gaming environment, a game application software is installed and run on a cloud based computing device configured to run the game software—and which is integrated or coupled with server 106. The game application software is run on the computing device and video and audio gameplay data is streamed from the computing device (optionally through server 106) to a client terminal 102, where it is rendered for display and/or audio playback. A gameplayer who is operating client terminal 102 uses the interface controls of client terminal 102 to provide gameplay inputs—which are streamed back to the computing device on which the game software is being executed and is used as gameplay control inputs for the game software that is being run on said computing device. As a result, gameplayers from any location can play a video game or a computer game without having to secure specialized video game consoles, software or graphics processing hardware—and relying instead on securing on-demand execution of the game application software by a cloud based server or cloud based computing device.

Figure 2:
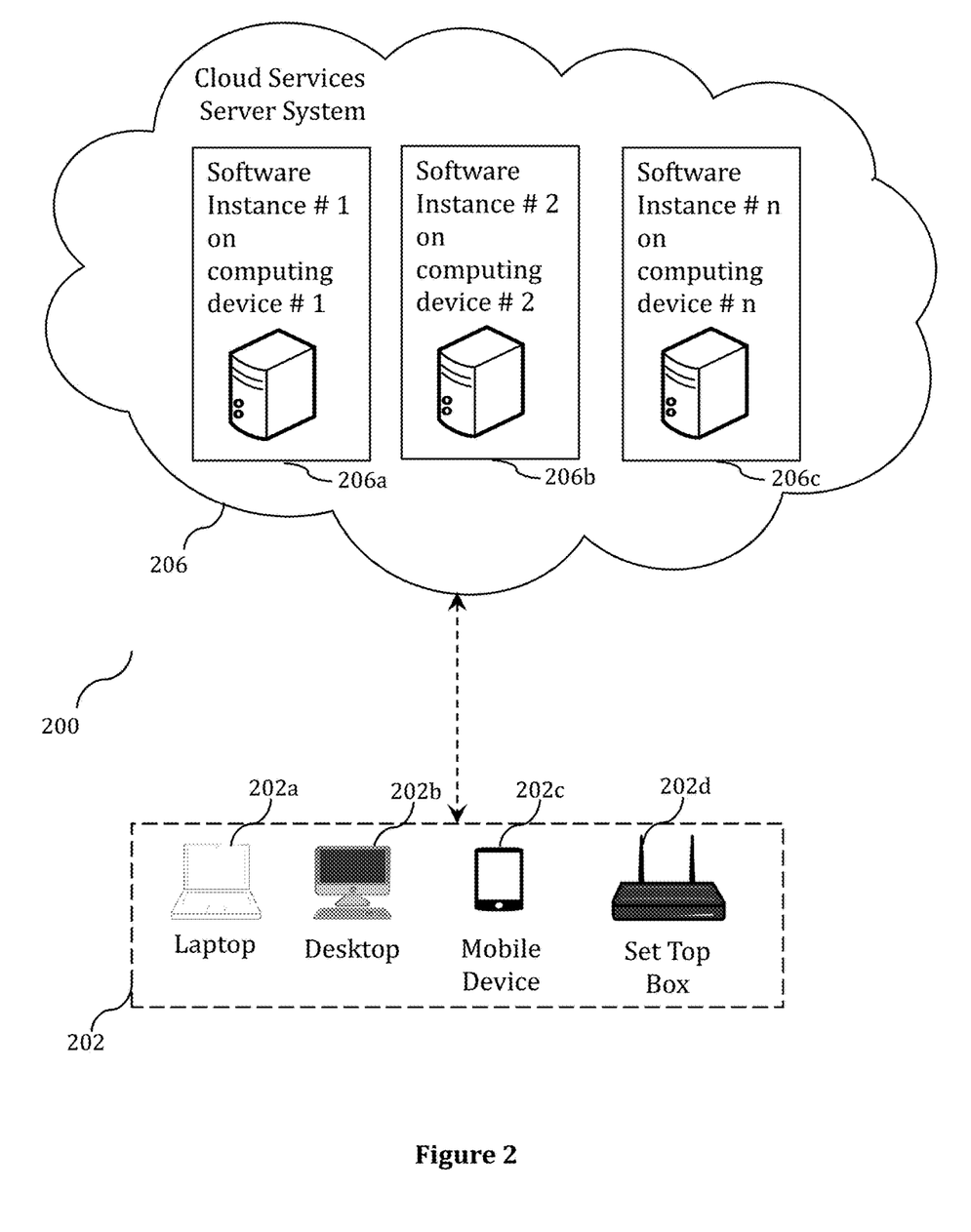

FIG. 2 illustrates system environment 200—which comprises one or more client terminals 202 (for example, any of laptop 202a, desktop 202b, mobile device 202c and/or set top box 202d) interfacing through a communication network such as a data network or the internet (not shown), with a cloud services server system 206. The cloud services server system 206 may comprise (or may be coupled with) a plurality of discrete or distinct computing systems (computing device #1, computing device #2 upto computing device #n)—each of which may be configured to be provisioned with, and to instantiate and run a discrete instance of one or more software applications. As a result, cloud services server system 206 may utilize the plurality of discrete or distinct computing systems to simultaneously run software instance #1 (206a), software instance #2 (206b), upto software instance #n (206c)—such that video and/or audio data from each of these software instances 206a to 206c may be streamed to one or more requesting client terminals 202a to 202d.

By way of an example:
- client terminal 202a may request cloud services server system 206 for cloud based execution of a first software application—and cloud services server system 206 may respond by (i) instantiating an instance of this first software application (software instance #1) to run on a first computing device (hardware device #1), and (ii) streaming video and/or audio data from the instance of the first software application to client terminal 202a.
- client terminal 202b may request cloud services server system 206 for cloud based execution of a second software application (which may be the same as the first software application, or may comprise a different software application)—and cloud services server system 206 may respond by (i) instantiating an instance of this second software application (software instance #2) to run on a second computing device (computing device #2), and (ii) streaming video and/or audio data from the instance of the second software application to client terminal 202b
- client terminal 202c may request cloud services server system 206 for cloud based execution of an $n^{th}$ software application (which may be the same as either of the first or second software applications, or may be different from both)—and cloud services server system 206 may respond by (i) instantiating an instance of this $n^{th}$ software application (software instance #n) to run on a $n^{th}$ computing device (computing device #n), and (ii) streaming video and/or audio data from the instance of the $n^{th}$ software application to client terminal 202c.

The present invention recognizes that a computing device located within a cloud services environment, and which is intended to be assigned for the purposes of cloud execution of an instance of a software application, may not have all hardware capabilities that are necessary for optimal execution of the software application. For example, while an ARM processor/RISC processor based computing device located within the cloud may be the primary device intended to be assigned for cloud-based execution of an Android™ gaming application, such computing device may lack the necessary GPU to render graphics and video streams at a sufficiently high frame rate.

The invention addresses this problem by assigning a plurality of computing devices to each instance of a software application—wherein each of the plurality of computing devices has at least one hardware capability or hardware configuration attribute that is not shared by the other computing devices within said plurality of computing devices. A first computing device among the plurality of computing devices is assigned for execution of software program instructions that are associated with (or that are part of) the software application and which have a first set of attributes. A second computing device among the plurality of computing devices is assigned for execution of software program instructions associated with (or that are part of) the software application and which have a second set of attributes. It will be understood that the assignment of a computing device for execution of software program instructions that have a first set of attributes or a second set of attributes is determined based on the hardware capabilities or hardware configuration attribute(s) of such computing device. In other words, the assignment step (i) identifies from among the plurality of computing devices, a first computing device having hardware capabilities or hardware configuration attributes that are optimized for execution of execution of software program instructions that have a first set of attributes—and assigns the first computing device for execution of software program instructions that are associated with (or that are part of) the software application and which have the first set of attributes, and (ii) identifies from among the plurality of computing devices, a second computing device having hardware capabilities or hardware configuration attributes that are optimized for execution of execution of software program instructions that have a second set of attributes—and assigns the second computing device for execution of software program instructions that are associated with (or that are part of) the software application and which have the second set of attributes.

Thereafter, when executing the instance of the software application, software program instructions corresponding to the software application are parsed or analyzed to determine attributes of said software program instruction(s). Software program instructions that are found to have the first set of attributes are routed for execution to the first computing device, while software program instructions that are found to have the second set of attributes are routed to the second computing device. As a result of such routing, a software program instruction having particular attributes is routed to and executed by a computing device having hardware capabilities or hardware configuration attributes that are optimized for execution of software instructions having those particular attributes.

Any output from each of the first computing device and the second computing device (i.e. the output arising out of execution of the software instructions respectively routed to each of these devices) that is required by the other of the first computing device and the second computing device is routed back to such first computing device or second computing device. In an embodiment, output from each of the first computing device and the second computing device (i.e. the output arising out of execution of the software instructions respectively routed to each of these devices) that is required to be transmitted back to a client terminal which has requested execution of the instance of the software application, is routed to a single computing device among the plurality of computing devices assigned to the instance of the software application, and is transmitted from such single computing device to the requesting client terminal.

By way of an illustrative example, the software application intended to be executed within a cloud services environment may comprise an Android™ based gaming software application, which has been requested for execution by a client terminal comprising a gameplayer's smartphone, through a web browser application running on the smartphone. The cloud services environment (or a server or other computing device within the cloud services environment) instantiates an instance of the gaming software application and assigns at least a first computing device and a second computing device for execution of the gaming software application. The first computing device comprises an ARM processor/RISC processor based computing device that is assigned for execution of all software instructions relating to the gaming software application but excluding software instructions that relate to rendering of graphics, video or images for the purposes of streaming a gameplay video stream to the gameplayer. The second computing device comprises a processor from the x86 family of processors and a graphics processor unit (GPU) that is assigned for execution of all software instructions that relate to rendering of graphics, video or images for the purposes of streaming a gameplay video stream to the gameplayer. During execution of the instance of the gaming software application, software instructions that require execution are analyzed to determine attributes thereof. Any software instruction that relates to rendering of graphics, video or images for the purposes of streaming a gameplay video stream to the gameplayer are routed to the second computing device for execution, while all other software instructions may be routed to the first computing device for execution.

In this illustrative example, the first computing device may be configured to operate as the primary computing device for executing the gaming software application, and may be used to implement the steps of analyzing attributes of software instructions, and routing such software instructions to a processor of the first computing device or to the second computing device based on such attributes. The output from each of the first computing device and the second computing device (i.e. the output arising out of execution of the software instructions respectively routed to each of these devices) that is required by the other of the first computing device and the second computing device is routed back to such first computing device or second computing device. In an embodiment, output from the second computing device (i.e. the output arising out of execution of the software instructions relating to rendering of graphics, video or images for the purposes of streaming a gameplay video stream to the gameplayer) that is required to be transmitted back to the gameplayer's smartphone, is routed to the first computing device, and is transmitted from the first computing device to the gameplayer's smartphone.

It would be understood that in one embodiment, each of the first computing device and the second computing device may comprise devices (e.g. cloud based devices) that are distinct from the requesting client terminal. In other embodiments, where the requesting client terminal has appropriate data processing capabilities, the second computing device may comprise the requesting client terminal itself—such that software program instructions associated with (or that are part of) the software application and which have a second set of attributes are routed to and/or executed by the requesting client terminal.

Figure 3:
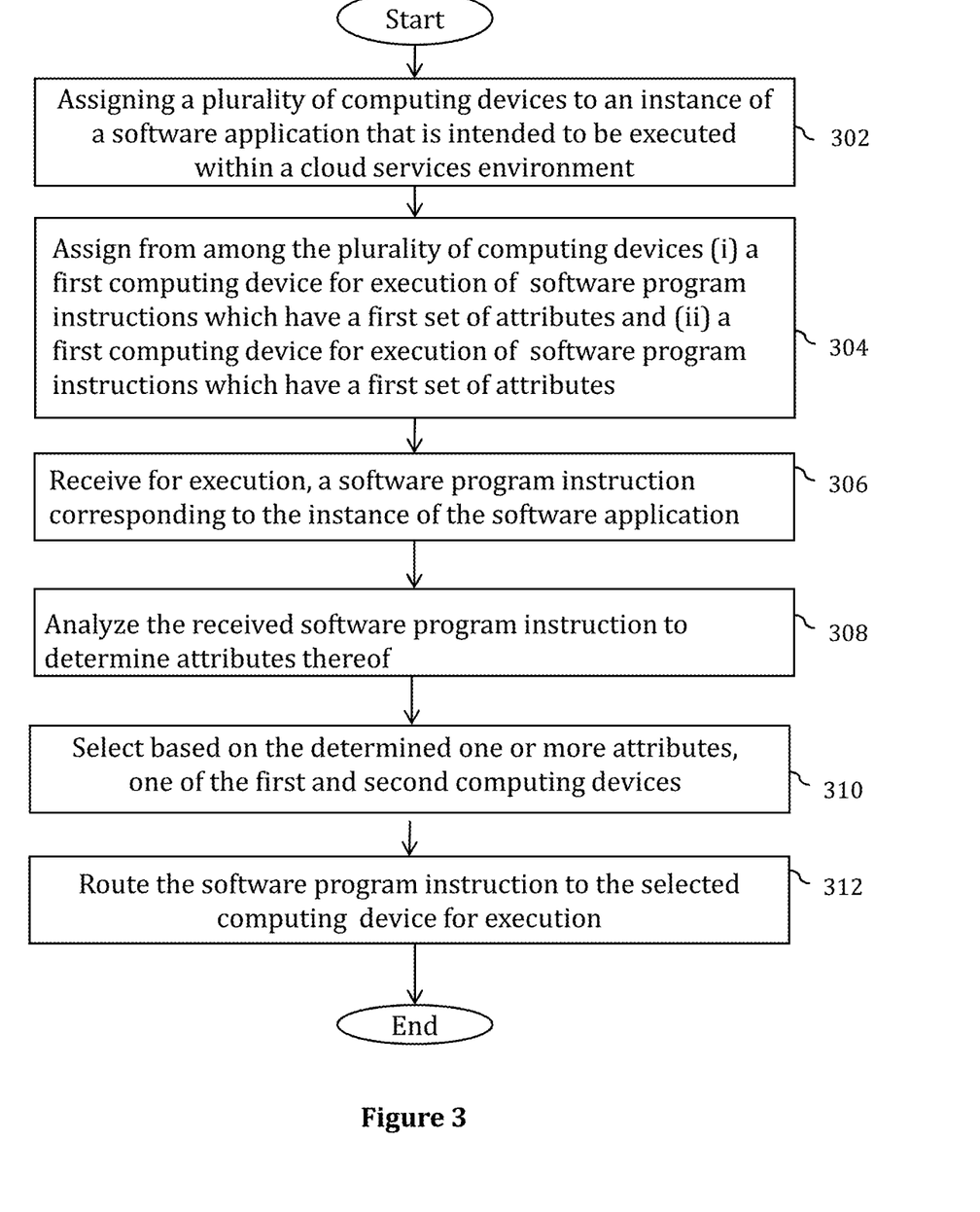
FIG. 3 is a flowchart illustrating a method of implementing cloud based cross-device execution of a software application, in accordance with the teachings of the present invention.

FIG. 3 is a flowchart illustrating a method of implementing cloud based cross-device execution of a software application, in accordance with the teachings of the present invention.

Step 302 comprises assigning a plurality of hardware devices to an instance of a software application that is intended to be executed within a cloud services environment. In an embodiment, each of the plurality of computing devices has at least one hardware capability or hardware configuration attribute that is not shared by the other computing devices within said plurality of computing devices. For example, where the software application is a gaming software application, step 302 may comprise assigning a first computing device and a second computing device to the instance of the gaming software application—wherein the first computing device may comprise an ARM processor/RISC processor based computing device and the second computing device comprises a processor from the x86 family of processors along with a graphics processor unit (GPU).

Step 304 comprises assigning from among the plurality of computing devices (i) a first computing device for execution of software application program instructions which have a first set of attributes and (ii) a second computing device for execution of software application program instructions which have a second set of attributes. So continuing with the example where the software application is a gaming software application, step 304 may comprise (i) assigning the ARM processor/RISC processor based first computing device for execution of all software instructions relating to the gaming software application but excluding software instructions that relate to rendering of graphics, video or images for the purposes of streaming a gameplay video stream to the gameplayer, and (ii) assigning the x86 processor and GPU based second computing device for execution of all software instructions that relate to rendering of graphics, video or images for the purposes of streaming a gameplay video stream to the gameplayer.

Step 306 comprises receiving for execution, a software application program instruction corresponding to the instance of the software application that is under execution within the cloud services environment.

Step 308 comprises analyzing the received software application program instruction and determining attributes of the received software application program instruction. In the illustrative example where the software application is a gaming software application, the determination at step 308 comprises determining whether the received software application program instruction relates to rendering of graphics, video or images for the purposes of streaming a gameplay video stream to the gameplayer, or alternatively whether the received software application program instruction comprises any other type of software program instruction.

Step 310 comprises selecting based on the determined one or more attributes of the software application program instruction, one of the first and second computing devices, for execution of the software application program instruction. In the event (i) the determined one or more attributes of the software application program instruction matches the first set of attributes, step 310 comprises selecting the first computing device, and (ii) the determined one or more attributes of the software application program instruction matches the second set of attributes, step 310 comprises selecting the second computing device—for execution of the software program instruction.

In the illustrative example where the software application program is a gaming software application program, step 310 comprises (i) selecting the first computing device comprising an ARM processor/RISC processor based computing device for software application program instruction execution, if the received software program instruction does not relate to rendering of graphics, video or images for the purposes of streaming a gameplay video stream to the gameplayer, and (ii) selecting the second computing device comprising a processor from the x86 family of processors along with a GPU if the received software application program instruction relates to rendering of graphics, video or images for the purposes of streaming a gameplay video stream to the gameplayer.

Step 312 comprises routing the software application program instruction to the selected computing device for execution. In the illustrative example where the software application program is a gaming software application, step 312 comprises (i) routing the software application program instruction to the first computing device comprising an ARM processor/RISC processor based computing device for software application program instruction execution, if the received software program instruction does not relate to rendering of graphics, video or images for the purposes of streaming a gameplay video stream to the gameplayer, and (ii) routing the software application program instruction to the second computing device comprising a processor from the x86 family of processors along with a GPU if the received software application program instruction relates to rendering of graphics, video or images for the purposes of streaming a gameplay video stream to the gameplayer.

It would be understood that in one embodiment of the method of FIG. 3, each of the first computing device and the second computing device may comprise devices (e.g. cloud based devices) that are distinct from the requesting client terminal. In other embodiments, where the requesting client terminal has appropriate data processing capabilities, the second computing device may comprise the requesting client terminal itself—such that software program instructions associated with (or that are part of) the software application and which have a second set of attributes are routed to and/or executed by the requesting client terminal.

Figure 4:
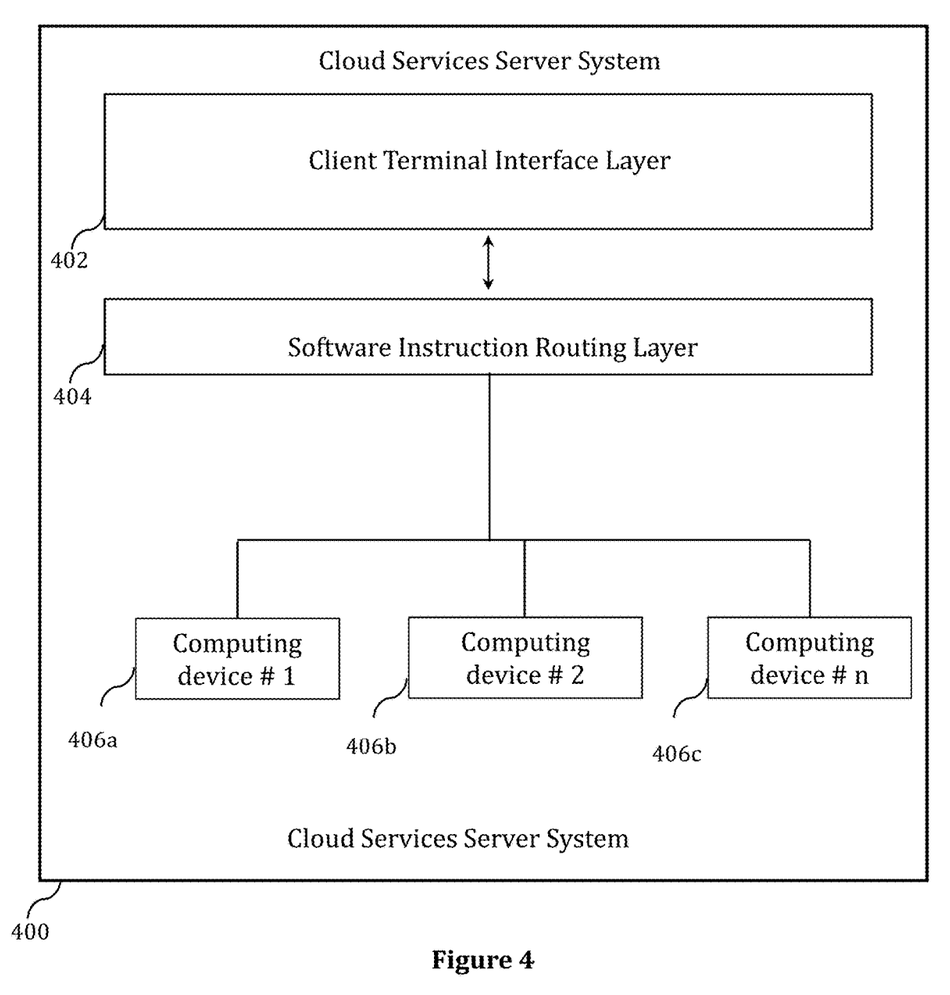
FIG. 4 illustrates an embodiment of a cloud based software services system configured in accordance with the teachings of the present invention.

FIG. 4 illustrates an embodiment of a cloud services server system 400 configured in accordance with the teachings of the present invention. Cloud services server system comprises a client terminal interface layer 402 comprising a processor implemented network communication interface layer that enables the cloud services server system 400 to communicate with one or more client terminals for the purposes of providing cloud services to such client terminal(s). Any and all data communications between computing devices within the cloud services server system 400 and one or more client terminals for the purposes of providing cloud services to said client terminals is routed through client device interface layer 402.

In the illustrated embodiment, cloud services server system 400 comprises a plurality of computing devices, including computing device #1 (406a), computing device #2 (406b), upto computing device #n (406c). In an embodiment, computing device #1 (406a) is a first computing device comprising an ARM processor/RISC processor based hardware system, while computing device #2 (406b) is a second computing device comprising a processor within the x86 family of processors along with a GPU, and computing device #n (406c) comprises a processor within the x86 family of processors. A selection of computing devices from among these plurality of computing devices 406a to 406c may be assigned for execution of an instance of a software application in accordance with the teachings of step 302 of the method of FIG. 3. In an embodiment at least one of computing devices 406a to 406c is an ARM processor/RISC processor based computing device, and at least one other of computing devices 406a to 406c is a computing device having a GPU and optionally a processor from the x86 family of processors.

Cloud services server system 400 additionally includes a processor implemented software instruction routing layer 404 configured to implement one or more of steps 306 to 312 of the method of FIG. 3—i.e. the steps of (i) receiving for execution, a software program instruction corresponding to the instance of the software application that is under execution within the cloud services server system 400, (ii) analyzing the received software program instruction and determining attributes of the received software program instruction, (iii) selecting based on the determined one or more attributes of the software program instruction, one of the computing devices #1 to #n, for execution of the software program instruction, and (iv) routing the software program instruction to the selected computing device for execution.

In an embodiment, software instruction routing layer 404 may be implemented within one of computing device #1 (406a), computing device #2 (406b) upto computing device #n (406c). In another embodiment, software instruction routing layer 404 may be implemented within a computing device other than computing device #1 (406*a*), computing device #2 (406*b*) upto computing device #n (406*c*).

It would be understood that in one embodiment of the system of FIG. 4, each of the first computing device and the second computing device may comprise devices (e.g. cloud based devices) that are distinct from a client terminal to which cloud based services are being provided. In other embodiments, where the requesting client terminal has appropriate data processing capabilities, any of computing device #1 (406*a*), computing device #2 (406*b*), upto computing device #n (406*c*) may comprise the requesting client terminal itself.

In an embodiment, the invention provides a method for cross-device implementation of cloud based software application execution by a cloud services server system, wherein output data from an instance of the cloud based software application is streamed to and rendered on a client terminal that is interfaced with the cloud services server system through a network. The method comprises the steps of (i) assigning a plurality of hardware devices for execution of the instance of the cloud based software application, the plurality of hardware devices comprising at least a first computing device and a second computing device, wherein (a) each of said first computing device and said second computing device are distinct from the client terminal, and (b) each of said first computing device and said second computing device has at least one hardware configuration attribute that is not shared by the other of said first computing device and said second computing device, (ii) assigning the first computing device for executing a first set of software application program instructions associated with functionality of the instance of the cloud based software application, wherein the first set of software application program instructions which have a first set of attributes, and (iii) assigning the second computing device for executing a second set of software application program instructions associated with functionality of the instance of the cloud based software application, wherein the second set of software application program instructions which have a second set of attributes, (iv) receiving a software application program instruction for execution, wherein said software application program instruction is associated with functionality of the instance of the cloud based software application, (v) determining attributes of the received software application program instruction, (vi) selecting based on one or more determined attributes of the received software application program instruction, one of the first computing device and the second computing device for execution of the received software application program instruction, wherein the step of selecting one of the client terminal and the server comprises (c) responsive to the one or more determined attributes matching attributes within the first set of attributes, selecting the first computing device for execution of the received software application program instruction, and (d) responsive to the one or more determined attributes matching attributes within the second set of attributes, selecting the second computing device for execution of the received software application program instruction, (vii) routing the received software application program instruction to the selected first or second computing device for execution by the selected first or second computing device.

In an embodiment of the method, the cloud based software application is a gaming software application, and wherein only the second computing device includes a graphics processing unit.

In another embodiment of the method, the cloud based software application is a gaming software application, wherein (i) one of the first computing device and the second computing device comprises any of an Advanced RISC Machine (ARM) processor, a Reduced Instruction Set Computing (RISC) processor, or a mobile device processor, and (ii) the other of the first computing device and the second computing device comprises a processor from the x86 family of processors and a graphics processor unit.

In a further embodiment of the method, responsive to the attributes of the received software application program instruction establishing that the received software application program instruction relates to rendering of graphics, video or images for the purposes of streaming a video stream, the step of selecting one of the first computing device and the second computing device for execution of the received software application program instruction, comprises selection of the second computing device that includes the graphic processing unit.

In a more specific embodiment of the method, responsive to the attributes of the received software application program instruction establishing that the received software application program instruction is unrelated to rendering of graphics, video or images for the purposes of streaming a video stream, the step of selecting one of the first computing device and the second computing device for execution of the received software application program instruction, comprises selection of the first computing device that does not include the graphic processing unit.

The invention also provides a system for cross-device implementation of cloud based software application execution by a cloud services server system, wherein output data from an instance of the cloud based software application is streamed to and rendered on a client terminal that is interfaced with the cloud services server system through a network. The system comprises at least one processor and a non-transitory memory. The processor is configured to implement the steps of (i) assigning a plurality of hardware devices for execution of the instance of the cloud based software application, the plurality of hardware devices comprising at least a first computing device and a second computing device, wherein (a) each of said first computing device and said second computing device are distinct from the client terminal, and (b) each of said first computing device and said second computing device has at least one hardware configuration attribute that is not shared by the other of said first computing device and said second computing device, (ii) assigning the first computing device for executing a first set of software application program instructions associated with functionality of the instance of the cloud based software application, wherein the first set of software application program instructions which have a first set of attributes, and (iii) assigning the second computing device for executing a second set of software application program instructions associated with functionality of the instance of the cloud based software application, wherein the second set of software application program instructions which have a second set of attributes, (iv) receiving a software application program instruction for execution, wherein said software application program instruction is associated with functionality of the instance of the cloud based software application, (v) determining attributes of the received software application program instruction, (vi) selecting based on one or more determined attributes of the received software application program instruction, one of the first computing device and the second computing device for execution of the received software application program instruction, wherein the step of selecting one of the client terminal and the server comprises (c) responsive to the one or more determined attributes matching attributes within the first set of attributes, selecting the first computing device for execution of the received software application program instruction, and (d) responsive to the one or more determined attributes matching attributes within the second set of attributes, selecting the second computing device for execution of the received software application program instruction, (vii) routing the received software application program instruction to the selected first or second computing device for execution by the selected first or second computing device.

In an embodiment of the system, the cloud based software application is a gaming software application, and only the second computing device includes a graphics processing unit.

In another embodiment of the system, the cloud based software application is a gaming software application, and (i) one of the first computing device and the second computing device comprises any of an Advanced RISC Machine (ARM) processor, a Reduced Instruction Set Computing (RISC) processor, or a mobile device processor, and (ii) the other of the first computing device and the second computing device comprises a processor from the x86 family of processors and a graphics processor unit.

In a further embodiment of the system, said system is configured such that responsive to the attributes of the received software application program instruction establishing that the received software application program instruction relates to rendering of graphics, video or images for the purposes of streaming a video stream, the step of selecting one of the first computing device and the second computing device for execution of the received software application program instruction, comprises selection of the second computing device that includes the graphic processing unit.

In a more specific embodiment of the system, the system is configured such responsive to the attributes of the received software application program instruction establishing that the received software application program instruction is unrelated to rendering of graphics, video or images for the purposes of streaming a video stream, the step of selecting one of the first computing device and the second computing device for execution of the received software application program instruction, comprises selection of the first computing device that does not include the graphic processing unit.

The system also provides a computer program product cross-device implementation of cloud based software application execution by a cloud services server system, wherein output data from an instance of the cloud based software application is streamed to and rendered on a client terminal that is interfaced with the cloud services server system through a network. The computer program product comprising a non-transitory computer readable medium having a computer readable program code embodied therein. The computer readable program code comprises instructions for implementing the steps of (i) assigning a plurality of hardware devices for execution of the instance of the cloud based software application, the plurality of hardware devices comprising at least a first computing device and a second computing device, wherein (a) each of said first computing device and said second computing device are distinct from the client terminal, and (b) each of said first computing device and said second computing device has at least one hardware configuration attribute that is not shared by the other of said first computing device and said second computing device, (ii) assigning the first computing device for executing a first set of software application program instructions associated with functionality of the instance of the cloud based software application, wherein the first set of software application program instructions which have a first set of attributes, and (iii) assigning the second computing device for executing a second set of software application program instructions associated with functionality of the instance of the cloud based software application, wherein the second set of software application program instructions which have a second set of attributes, (iv) receiving a software application program instruction for execution, wherein said software application program instruction is associated with functionality of the instance of the cloud based software application, (v) determining attributes of the received software application program instruction, (vi) selecting based on one or more determined attributes of the received software application program instruction, one of the first computing device and the second computing device for execution of the received software application program instruction, wherein the step of selecting one of the client terminal and the server comprises (c) responsive to the one or more determined attributes matching attributes within the first set of attributes, selecting the first computing device for execution of the received software application program instruction, and (d) responsive to the one or more determined attributes matching attributes within the second set of attributes, selecting the second computing device for execution of the received software application program instruction, (vii) routing the received software application program instruction to the selected first or second computing device for execution by the selected first or second computing device.

Figure 5:
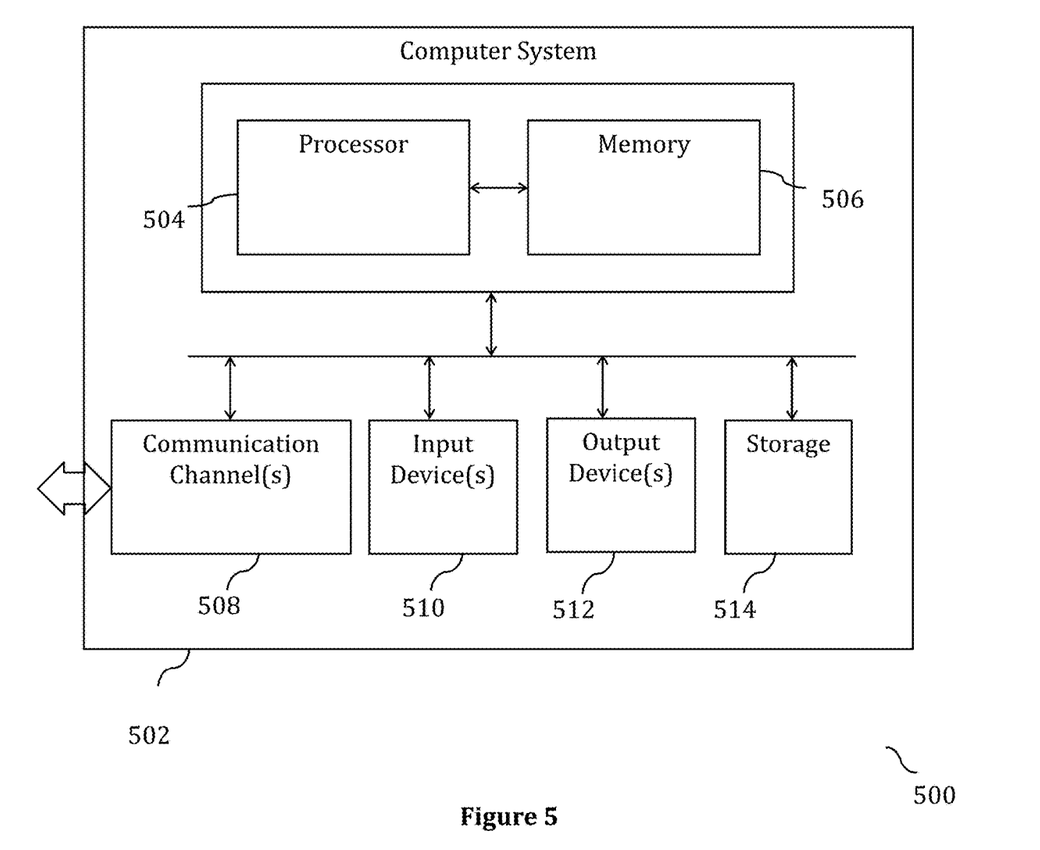
FIG. 5 illustrates an exemplary system for implementing the present invention.

FIG. 5 illustrates an exemplary system 500 for implementing the present invention. The illustrated system 500 comprises computer system 502 which in turn comprises one or more processors 504 and at least one memory 506. Processor 504 is configured to execute program instructions—and may be a real processor or a virtual processor. It will be understood that computer system 502 does not suggest any limitation as to scope of use or functionality of described embodiments. The computer system 502 may include, but is not be limited to, one or more of a general-purpose computer, a programmed microprocessor, a microcontroller, an integrated circuit, and other devices or arrangements of devices that are capable of implementing the steps that constitute the method of the present invention. Exemplary embodiments of a computer system 502 in accordance with the present invention may include one or more servers, desktops, laptops, tablets, smart phones, mobile phones, mobile communication devices, tablets, phablets and personal digital assistants. In an embodiment of the present invention, the memory 506 may store software for implementing various embodiments of the present invention. The computer system 502 may have additional components. For example, the computer system 502 may include one or more communication channels 508, one or more input devices 510, one or more output devices 512, and storage 514. An interconnection mechanism (not shown) such as a bus, controller, or network, interconnects the components of the computer system 502. In various embodiments of the present invention, operating system software (not shown) provides an operating environment for various softwares executing in the computer system 502 using a processor 504, and manages different functionalities of the components of the computer system 502.

The communication channel(s) 508 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 510 may include, but is not limited to, a touch screen, a keyboard, mouse, pen, joystick, trackball, a voice device, a scanning device, or any another device that is capable of providing input to the computer system 502. In an embodiment of the present invention, the input device(s) 510 may be a sound card or similar device that accepts audio input in analog or digital form. The output device(s) 512 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 502.

The storage 514 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 502. In various embodiments of the present invention, the storage 514 may contain program instructions for implementing any of the described embodiments.

In an embodiment of the present invention, the computer system 502 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 502. The method described herein is typically implemented as a computer program product, comprising a set of program instructions that is executed by the computer system 502 or any other similar device. The set of program instructions may be a series of computer readable codes stored on a tangible medium, such as a computer readable storage medium (storage 514), for example, diskette, CD-ROM, ROM, flash drives or hard disk, or transmittable to the computer system 502, via a modem or other interface device, over either a tangible medium, including but not limited to optical or analogue communications channel(s) 508. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The invention accordingly enables cross-device based implementation of cloud based software program execution, in a manner that software program instructions corresponding to an instance of a software application that is under execution, are routed to and executed across a plurality of computing devices, wherein the routing decisions are based on identification of computing devices having hardware capabilities or hardware configuration attributes that are optimized for execution of the routed software instructions.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

I claim:

1. A method for cross-device implementation of cloud based software application execution by a cloud services server system, wherein output data from an instance of the cloud based software application is streamed to and rendered on a client terminal that is interfaced with the cloud services server system through a network, the method comprising the steps of:

assigning a plurality of hardware devices for execution of the instance of the cloud based software application, the plurality of hardware devices comprising at least a first computing device and a second computing device, wherein:

each of said first computing device and said second computing device are distinct from the client terminal; and each of said first computing device and said second computing device has at least one hardware configuration attribute that is not shared by the other of said first computing device and said second computing device;

assigning the first computing device for executing a first set of software application program instructions associated with functionality of the instance of the cloud based software application, wherein the first set of software application program instructions which have a first set of attributes; and assigning the second computing device for executing a second set of software application program instructions associated with functionality of the instance of the cloud based software application, wherein the second set of software application program instructions which have a second set of attributes;

receiving a software application program instruction for execution, wherein said software application program instruction is associated with the functionality of the instance of the cloud based software application;

determining one or more attributes of the received software application program instruction;

selecting based on the one or more determined attributes of the received software application program instruction, one of the first computing device and the second computing device for execution of the received software application program instruction, wherein the step of selecting one of the client terminal and the server comprises:

responsive to the one or more determined attributes matching attributes within the first set of attributes, selecting the first computing device for execution of the received software application program instruction; and responsive to the one or more determined attributes matching attributes within the second set of attributes, selecting the second computing device for execution of the received software application program instruction;

routing the received software application program instruction to the selected first or second computing device for execution by the selected first or second computing device.

2. The method as claimed in claim 1, wherein the cloud based software application is a gaming software application, and wherein only the second computing device includes a graphics processing unit.

3. The method as claimed in claim 2, wherein responsive to the one or more determined attributes of the received software application program instruction establishing that the received software application program instruction relates to rendering of graphics, video or images for the purposes of streaming a video stream, the step of selecting one of the first computing device and the second computing device for execution of the received software application program instruction, comprises selection of the second computing device that includes the graphic processing unit.

4. The method as claimed in claim 3, wherein responsive to the one or more determined attributes of the received software application program instruction establishing that the received software application program instruction is unrelated to rendering of graphics, video or images for the purposes of streaming the video stream, the step of selecting one of the first computing device and the second computing device for execution of the received software application program instruction, comprises selection of the first computing device that does not include the graphic processing unit.

5. The method as claimed in claim 1, wherein the cloud based software application is a gaming software application, and wherein:
one of the first computing device and the second computing device comprises any of an Advanced RISC Machine (ARM) processor, a Reduced Instruction Set Computing (RISC) processor, or a mobile device processor; and
the other of the first computing device and the second computing device comprises a processor from the x86 family of processors and a graphics processor unit.

6. A system for cross-device implementation of cloud based software application execution by a cloud services server system, wherein output data from an instance of the cloud based software application is streamed to and rendered on a client terminal that is interfaced with the cloud services server system through a network, the system comprising:
at least one processor; and
a non-transitory memory,
wherein the processor is configured or programmed to implement the steps of:
assigning a plurality of hardware devices for execution of the instance of the cloud based software application, the plurality of hardware devices comprising at least a first computing device and a second computing device, wherein:
each of said first computing device and said second computing device are distinct from the client terminal; and
each of said first computing device and said second computing device has at least one hardware configuration attribute that is not shared by the other of said first computing device and said second computing device;

assigning the first computing device for executing a first set of software application program instructions associated with functionality of the instance of the cloud based software application, wherein the first set of software application program instructions which have a first set of attributes; and
assigning the second computing device for executing a second set of software application program instructions associated with functionality of the instance of the cloud based software application, wherein the second set of software application program instructions which have a second set of attributes;
receiving a software application program instruction for execution, wherein said software application program instruction is associated with the functionality of the instance of the cloud based software application;
determining one or more attributes of the received software application program instruction;
selecting based on the one or more determined attributes of the received software application program instruction, one of the first computing device and the second computing device for execution of the received software application program instruction, wherein the step of selecting one of the client terminal and the server comprises:
responsive to the one or more determined attributes matching attributes within the first set of attributes, selecting the first computing device for execution of the received software application program instruction; and
responsive to the one or more determined attributes matching attributes within the second set of attributes, selecting the second computing device for execution of the received software application program instruction;
routing the received software application program instruction to the selected first or second computing device for execution by the selected first or second computing device.

7. The system as claimed in claim 6, wherein the cloud based software application is a gaming software application, and wherein only the second computing device includes a graphics processing unit.

8. The system as claimed in claim 7, configured such that responsive to the one or more determined attributes of the received software application program instruction establishing that the received software application program instruction relates to rendering of graphics, video or images for the purposes of streaming a video stream, the step of selecting one of the first computing device and the second computing device for execution of the received software application program instruction, comprises selection of the second computing device that includes the graphic processing unit.

9. The system as claimed in claim 8, configured such that responsive to the one or more determined attributes of the received software application program instruction establishing that the received software application program instruction is unrelated to rendering of graphics, video or images for the purposes of streaming the video stream, the step of selecting one of the first computing device and the second computing device for execution of the received software application program instruction, comprises selection of the first computing device that does not include the graphic processing unit.

10. The system as claimed in claim 6, wherein the cloud based software application is a gaming software application, and wherein:
- one of the first computing device and the second computing device comprises any of an Advanced RISC Machine (ARM) processor, a Reduced Instruction Set Computing (RISC) processor, or a mobile device processor; and
- the other of the first computing device and the second computing device comprises a processor from the x86 family of processors and a graphics processor unit.

11. A computer program product cross-device implementation of cloud based software application execution by a cloud services server system, wherein output data from an instance of the cloud based software application is streamed to and rendered on a client terminal that is interfaced with the cloud services server system through a network, the computer program product comprising a non-transitory computer readable medium having a computer readable program code embodied therein, the computer readable program code comprising instructions for implementing the steps of:
- assigning a plurality of hardware devices for execution of the instance of the cloud based software application, the plurality of hardware devices comprising at least a first computing device and a second computing device, wherein:
  - each of said first computing device and said second computing device are distinct from the client terminal; and
  - each of said first computing device and said second computing device has at least one hardware configuration attribute that is not shared by the other of said first computing device and said second computing device;
- assigning the first computing device for executing a first set of software application program instructions associated with functionality of the instance of the cloud based software application, wherein the first set of software application program instructions which have a first set of attributes; and
- assigning the second computing device for executing a second set of software application program instructions associated with functionality of the instance of the cloud based software application, wherein the second set of software application program instructions which have a second set of attributes;
- receiving a software application program instruction for execution, wherein said software application program instruction is associated with the functionality of the instance of the cloud based software application;
- determining one or more attributes of the received software application program instruction;
- selecting based on the one or more determined attributes of the received software application program instruction, one of the first computing device and the second computing device for execution of the received software application program instruction, wherein the step of selecting one of the client terminal and the server comprises:
  - responsive to the one or more determined attributes matching attributes within the first set of attributes, selecting the first computing device for execution of the received software application program instruction; and
  - responsive to the one or more determined attributes matching attributes within the second set of attributes, selecting the second computing device for execution of the received software application program instruction;
- routing the received software application program instruction to the selected first or second computing device for execution by the selected first or second computing device.

* * * * *